No. 689,227. Patented Dec. 17, 1901.
C. B. ROBERTSON.
TROLLEY CATCHER.
(Application filed Mar. 5, 1901.)

(No Model.)

WITNESSES:

INVENTOR:
Chas. B. Robertson,
BY
Milo B. Stevens & Co.
ATTORNEYS.

UNITED STATES PATENT OFFICE.

CHARLES B. ROBERTSON, OF OTTUMWA, IOWA.

TROLLEY-CATCHER.

SPECIFICATION forming part of Letters Patent No. 689,227, dated December 17, 1901.

Application filed March 5, 1901. Serial No. 49,848. (No model.)

*To all whom it may concern:*

Be it known that I, CHARLES B. ROBERTSON, a citizen of the United States, residing at 537 Center street, Ottumwa, in the county of Wapello and State of Iowa, have invented certain new and useful Improvements in Trolley-Catchers; and I do declare the following to be a full, clear, and exact description of the invention, such as will enable others skilled in the art to which it appertains to make and use the same, reference being had to the accompanying drawings, and to the letters of reference marked thereon, which form a part of this specification.
This invention relates to an improvement in trolley-catchers of that type designed more particularly for attachment to the rear of the car and adapted when a trolley jumps its wire to automatically draw the trolley-pole downwardly to prevent the same coming in contact with cross-wires or other obstacles which might thus become injured by contact therewith or injure the trolley and its associated parts.
An object of the invention is to provide means for normally retaining the trolley-operating rope taut and in means for automatically winding said rope to retract the trolley-pole whenever the wheel becomes disengaged from the line-wire.

Improved details in the construction and arrangement of the several parts of the device will be clear from the detailed description hereinafter when read in connection with the accompanying drawings, forming part hereof, and the appended claims.

In said drawings like letters of reference refer to corresponding parts in both views.

Figure 1:
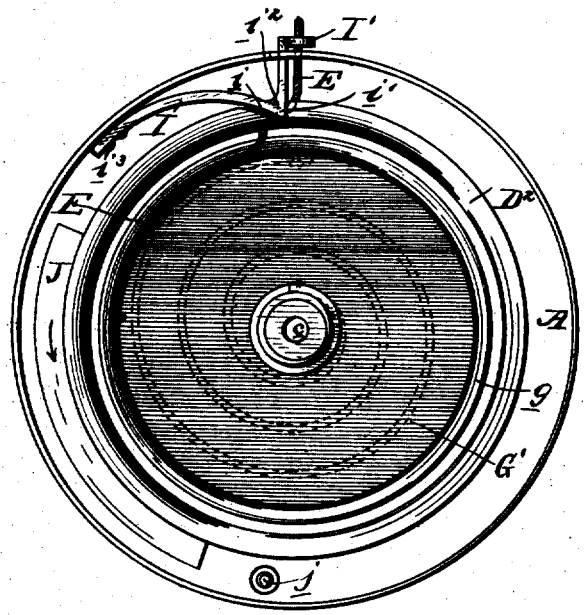
Figure 2:
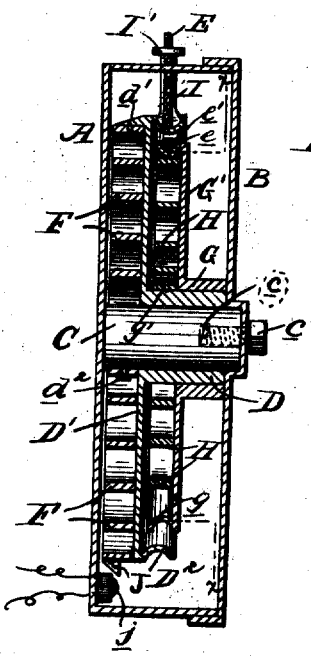

Figure 1 is a plan view of the device, the cover being removed and parts being broken away, as indicated at $x$ $x$, Fig. 2; and Fig. 2 is a vertical sectional view.

Referring more specifically to the drawings, A designates a sheet-metal box or casing, and B a cover therefor. Rigidly secured in position centrally of the box or casing is the spindle C, provided at its upper end with a screw-threaded aperture $c$, into which is adapted to engage a screw-threaded locking-bolt $c'$, designed to secure the cover in place upon the casing.

Loosely mounted upon the spindle C is a hub D of the wheel D', provided upon one surface with the rim semicircular in cross-section, around which an operating-rope E, connected at one end with the trolley-head, is adapted to pass when the device is operated, as hereinafter specified. On the opposite surface of this wheel projects a lug or flange $d'$, to which one end of a helical spring F is secured, the opposite end of the spring being fastened to the spindle C at $d^2$. The wheel D and its hub are free to revolve upon the spindle.

Adapted to revolve around the hub just referred to is a somewhat similar but relatively smaller hub G of a wheel G', the same being provided with a flange $g$ similar to and projecting beneath the flange $D^2$ of the wheel D. Secured interiorly of this last-mentioned wheel, one end to the flange thereof and the opposite end at $g'$ to the hub of the wheel D, is a helical spring H of somewhat weaker tendency than the corresponding spring of the opposite wheel.

The flange of the wheel D is provided with an aperture $e$, provided with a rounded eyelet $e'$, through which the operating-rope passes, and is fastened at its extreme end to the periphery of the smaller wheel. Normally the tension of the spring connected to the smaller wheel is sufficiently strong to revolve the same and take up any slack in the operating-rope, but has not sufficient tension to affect the trolley-pole. By having the rope taut at all times the action of the stronger main winding-wheel D is expedited. The spring of the wheel D is such as to normally tend to revolve the same in the direction of the arrow, Fig. 1, and wind the operating-rope thereupon to draw the trolley-pole downward. Some means must be employed for preventing the action of the spring under more ordinary circumstances and for automatically tripping the same to permit its operation in cases of emergency. For these purposes I provide in the periphery of the wheel D a recessed portion $i$, provided at one end with a shoulder $i'$, which is adapted to engage the point $i^2$ of a spring-pawl I, secured at $i^3$ to the side wall of the casing. Above the point of the pawl a ring or eyelet I' is formed thereon, through which the operating-rope E passes, as shown. It will be apparent that should the trolley-wheel jump its wire or be otherwise disengaged therefrom, whereby the pole will initially fly upward, such upward movement will draw the catch out of engagement with the notched portion in the periphery of the larger wheel, whereupon the same will be revolved by the severe tension of its spring to wind up the operating-rope to a sufficient degree to lower the pole and its associated parts.

It will be appreciated that variations in the arrangement of the several parts of the device just described may be made without in the least departing from the nature of the invention.

That the operator of a car may know that the trolley has left its wire the wheel D' is provided with a flange J, projecting outwardly and to one side thereof, the same being adapted when the wheel is revolved to come in contact with a push-button or other contact $j$, so as to establish electrical communication with a bell or other signal in the body of the car within hearing of the operator.

Having thus described the invention, what is claimed as new, and desired to be secured by Letters Patent, is—

1. A trolley-catcher comprising a support, an operating-rope attached to a trolley-pole, a spindle in the support, wheels provided with superposed hubs loosely mounted upon said spindle capable of independent rotation, flanges on the wheels projecting laterally in opposite directions so as to overhang, an operating-spring for each wheel, an opening in the outer flange through which the operating-rope is adapted to pass and be attached to the inner flange, and automatic controlling means for the wheel carrying the outer flange, substantially as described.

2. In combination, a casing, a trolley-catcher in the casing comprising a spring-operated wheel, a rope adapted to be secured to the trolley-pole and be wound upon said wheel through an opening in the casing, means for normally preventing rotation of said wheel, a beveled flange or projection on the wheel extending outwardly therefrom, and a contact secured to the casing in the path of said flange or projection adapted to be engaged thereby when the wheel is rotated to establish communication with an alarm, substantially as described.

In testimony whereof I affix my signature in presence of two witnesses.

CHARLES B. ROBERTSON.

Witnesses:
D. R. JANNEY,
C. W. COPELAND.